United States Patent
Bjorkengren (10) Patent No.: US 9,971,622 B2
(45) Date of Patent: May 15, 2018

(54) TECHNOLOGIES FOR APPLICATION MIGRATION USING LIGHTWEIGHT VIRTUALIZATION

(71) Applicant: Intel Corporation, Santa Clara, CA (US)

(72) Inventor: Ulf Bjorkengren, Bjärred (SE)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 14/750,938

(22) Filed: Jun. 25, 2015

(65) Prior Publication Data

US 2016/0378525 A1 Dec. 29, 2016

(51) Int. Cl.
G06F 9/455 (2018.01)
G06F 9/50 (2006.01)

(52) U.S. Cl.
CPC ........ *G06F 9/45558* (2013.01); *G06F 9/5088* (2013.01); *G06F 2009/4557* (2013.01); *G06F 2009/45595* (2013.01)

(58) Field of Classification Search
CPC ............... G06F 9/45558; G06F 9/5088; G06F 2009/4557; G06F 2009/45595
USPC .......................................................... 718/1
See application file for complete search history.

(56) References Cited

U.S. PATENT DOCUMENTS

| | | | | |
|---|---|---|---|---|
| 6,044,475 A * | 3/2000 | Chung | ................ | G06F 11/1438 714/15 |
| 7,080,159 B2 * | 7/2006 | Chu | ......................... | G06F 8/20 709/220 |
| 7,562,254 B2 * | 7/2009 | Davis | ................. | G06F 17/3089 714/16 |
| 8,090,836 B1 * | 1/2012 | Bean | ..................... | G06F 9/4856 709/227 |
| 9,146,779 B2 * | 9/2015 | Kihara | | |
| 2002/0129126 A1 * | 9/2002 | Chu | ......................... | G06F 8/20 709/220 |

(Continued)

OTHER PUBLICATIONS

Van't Hof, Alexander, et al. "Flux: Multi-surface computing in Android." Proceedings of the Tenth European Conference on Computer Systems. ACM, Apr. 21-24, 2015, pp. 1-17.*

(Continued)

*Primary Examiner* — Benjamin Wu
*Assistant Examiner* — Willy W Huaracha
(74) *Attorney, Agent, or Firm* — Barnes & Thornburg LLP (57) ABSTRACT

Technologies for migrating an application from a source computing device to a destination computing device using lightweight virtualization includes a migration management module on each of the source and destination computing devices. The migration management module of the source computing device is configured to determine information of dependencies of the application to be migrated and perform a checkpointing operation on the application to generate application checkpoint data. The source computing device is further configured to transmit the dependencies and the application checkpoint data to the destination computing device. The migration management module of the destination computing device is configured to generate a container based on the dependency information and restore the application using the application checkpoint data. Other embodiments are described herein and claimed.

20 Claims, 6 Drawing Sheets

(56) References Cited

U.S. PATENT DOCUMENTS

| | | | | |
|---|---|---|---|---|
| 2009/0007147 | A1* | 1/2009 | Craft | G06F 9/455 |
| | | | | 719/320 |
| 2009/0157882 | A1* | 6/2009 | Kashyap | H04L 69/16 |
| | | | | 709/227 |
| 2010/0082816 | A1* | 4/2010 | Kharat | G06F 9/54 |
| | | | | 709/226 |
| 2012/0227058 | A1* | 9/2012 | Hunt | G06F 9/45558 |
| | | | | 719/318 |
| 2014/0137125 | A1* | 5/2014 | Hsu | G06F 9/4856 |
| | | | | 718/102 |
| 2014/0359103 | A1* | 12/2014 | Dalmau | H04L 67/34 |
| | | | | 709/223 |
| 2016/0285958 | A1* | 9/2016 | Das | G06F 9/45558 |

OTHER PUBLICATIONS

Laadan, Oren, and Jason Nieh. "Transparent Checkpoint-Restart of Multiple Processes on Commodity Operating Systems." USENIX Annual Technical Conference. 2007, pp. 323-336.*

Mirkin, Andrey, Alexey Kuznetsov, and Kir Kolyshkin. "Containers checkpointing and live migration." Proceedings of the Linux Symposium. vol. 2. 2008, pp. 85-90.*

Dirk Merkel "Docker: lightweight Linux containers for consistent development and deployment", Linux Journal, vol. 2014 Issue 239, Mar. 2014, Article No. 2, pp. 1-5.*

* cited by examiner

TECHNOLOGIES FOR APPLICATION MIGRATION USING LIGHTWEIGHT VIRTUALIZATION

BACKGROUND

Modern computing devices have become ubiquitous tools for personal, business, and social uses. A single user may rely on a number of computing devices, mobile or otherwise, over a given period of time. For example, the user may wish to run an application on a desktop computing device while at home, the same application on a smartphone while riding public transportation to work, and the same application again on a laptop at the coffee-house after work. To accomplish such a scenario, the user can migrate the application from one computing device to another. Similarly, in data center environments, administrators may perform application migrations due to data center closures, compromised server security, disaster recovery, network infrastructure upgrades, etc.

Although application migration can be a useful tool, the migration of applications can be difficult because applications are typically developed to run on the platform on which the applications were developed and/or originally deployed on. Additionally, other elements (e.g., operating systems (OSs), management tools, networking architectures, storage systems, virtual machine (VM) configurations, etc.) are typically different between computing environments, further complicating migration efforts. Accordingly, VM technology may be used to migrate such applications. For example, VM technology may be used to wrap the application to be migrated, along with the guest OS in which the application runs, and then the wrapped data representing the state of the VM can be migrated. However, the amount of data associated with such an application migration can be very large. Accordingly, the transmission of such large amounts of data may be slow, especially over wireless network connections. Additionally, the startup time of the migrated VM may be slower than a native VM, giving the appearance that the migrated VM is faulty.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
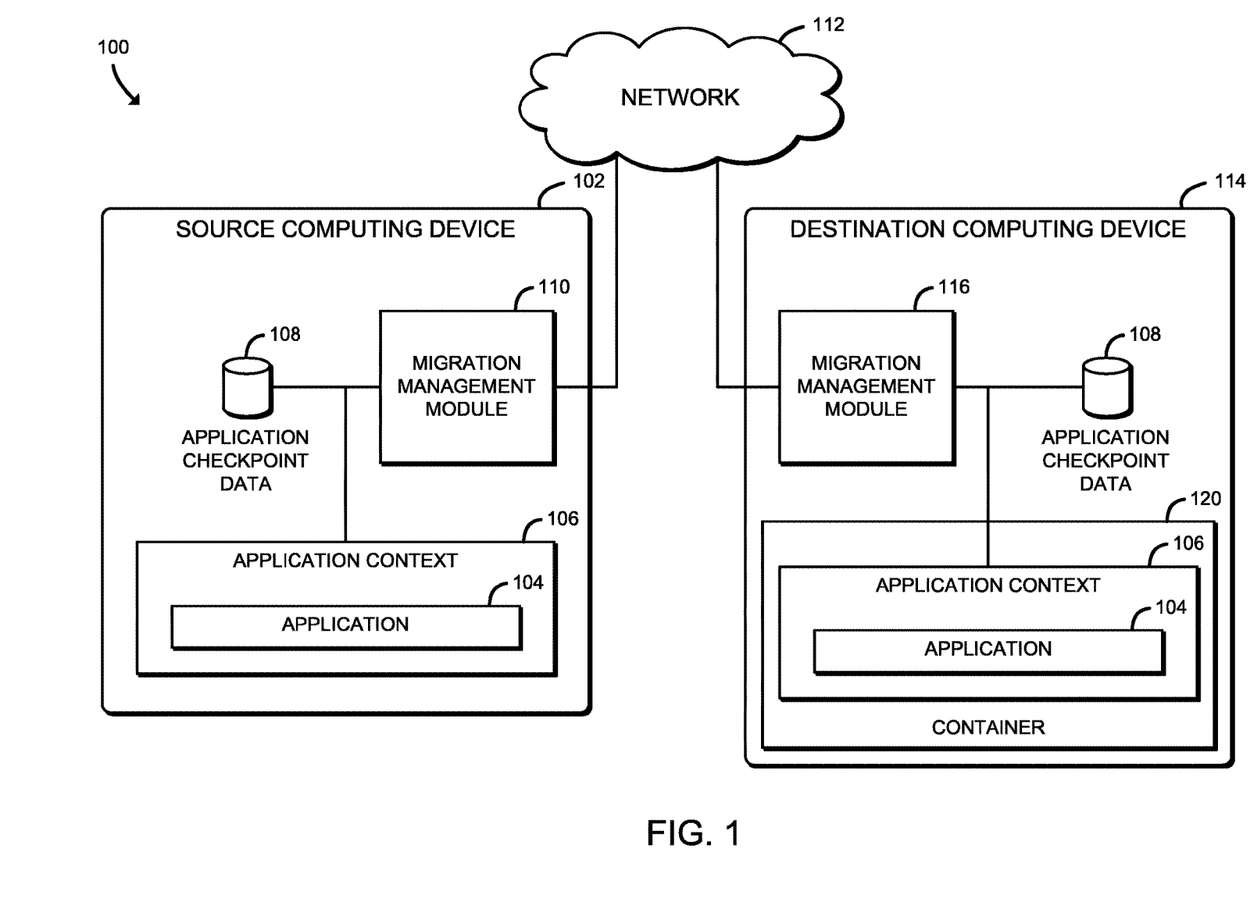
FIG. 1 is a simplified block diagram of at least one embodiment of a system for application migration using lightweight virtualization technology that includes a source computing device and a destination computing device.

Referring now to FIG. 1, in an illustrative embodiment, a system 100 for migrating an application 104 includes a source computing device 102 and a destination computing device 114 in communication over a network 112. The source computing device 102 and the destination computing device 114 are each configured to support migration of the application 104 from the source computing device 102 to the destination computing device 114 using a migration management module 110 of the source computing device 102 and a complimentary migration management module 116 of the destination computing device 114. To migrate the application 104, the source computing device 102 is configured to transmit information indicative of an application context 106 of the application to be migrated (e.g., an operating system, application packages, and dependencies) to the destination computing device 114. In response, the destination computing device 114 is configured to setup a container 120 in which to restore the application 104 based on the information related to the application context 106 received from the source computing device 102.

Further, the source computing device 102 is configured to perform a checkpoint operation on the application 104 and transmit the resulting application checkpoint data 108 to the destination computing device 114. The destination computing device 114 is further configured to install relevant software (e.g., a copy of the operating system, application packages, dependencies, etc.) and perform a restore operation on the application 104 within the container 120, based on the application checkpoint data 108 received from the source computing device 102.

The source computing device 102 may be embodied as any type of computation or computing device capable of performing the functions described herein, including, without limitation, a computer, a smartphone, a tablet computer, a laptop computer, a notebook computer, a desktop computer, a workstation, a mobile computing device, a wearable computing device, a multiprocessor system, a server (e.g., stand-alone, rack-mounted, blade, etc.), a network appliance (e.g., physical or virtual), a web appliance, a distributed computing system, a processor-based system, and/or a consumer electronic device.

Figure 2:
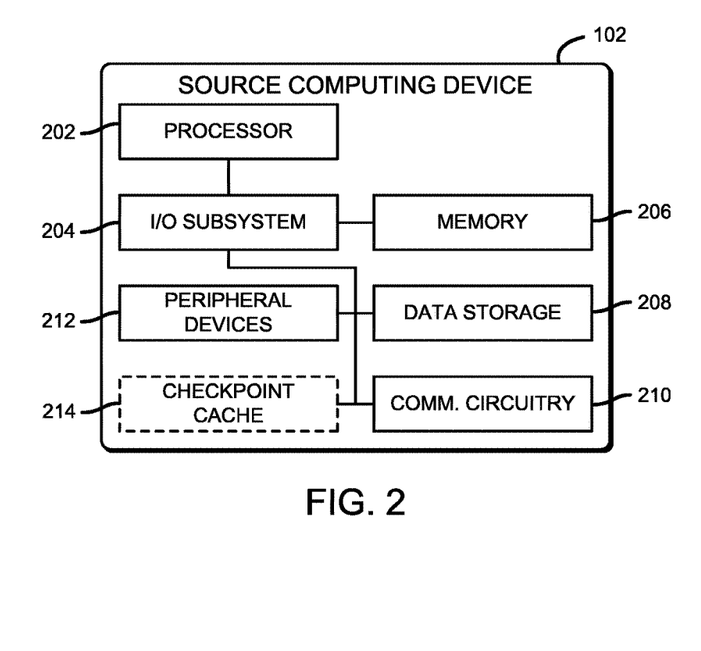
FIG. 2 is a simplified block diagram of at least one embodiment of the source computing device of FIG. 1.

As shown in FIG. 2, the illustrative source computing device 102 includes a processor 202, an input/output (I/O) subsystem 204, a memory 206, a data storage device 208, communication circuitry 210, and peripheral devices 212. Of course, in other embodiments, the source computing device 102 may include alternative or additional components, such as those commonly found in a computing device (e.g., a cache memory, a graphics processing unit (GPU), etc.). Additionally, in some embodiments, one or more of the illustrative components may be incorporated in, or otherwise form a portion of, another component. For example, the memory 206, or portions thereof, may be incorporated in one or more processors 202 in some embodiments.

The processor 202 may be embodied as any type of processor capable of performing the functions described herein. The processor 202 may be embodied as a single-core processor or a multi-core processor, multiple processors, a digital signal processor, a microcontroller, a graphics processing unit (GPU), a general purpose GPU (GPGPU), an accelerated processing unit (APU), a field-programmable gate array (FPGA), or other processor or processing/controlling circuit. The memory 206 may be embodied as any type of volatile or non-volatile memory or data storage capable of performing the functions described herein. In operation, the memory 206 may store various data and software used during operation of the source computing device 102, such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the source computing device 102. For example, the I/O subsystem 204 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processors 202, the memory 206, and other components of the source computing device 102, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. In use, as described below, the data storage device 208 may store application checkpoint data generated by a checkpointing operation.

The communication circuitry 210 may be embodied as any communication circuit, device, or collection thereof, capable of enabling communications over the network 112 between source computing device 102 and the destination computing device 114. It should be appreciated that the network 112 includes one or more network devices (not shown) for effecting such communications. The communication circuitry 210 may be configured to use any one or more communication technologies (e.g., wired or wireless communication technologies) and associated protocols (e.g., Ethernet, Bluetooth®, Wi-Fi®, WiMAX, etc.) to effect such communication.

The peripheral devices 212 may include any number of input/output devices, user interface devices, and/or externally connected peripheral devices. For example, in some embodiments, the peripheral devices 212 may include a display, touch screen, graphics circuitry, keypad, keyboard, mouse, speaker system, and/or other input/output devices, interface devices, and/or peripheral devices. Additionally or alternatively, the peripheral devices 212 may include one or more ports, such as a USB port, for example, for connecting external peripheral devices to the source computing device 102.

In some embodiments, the source computing device 102 may also include a checkpoint cache 214. Similar to the data storage device 208, the checkpoint cache 214 may be embodied as any type of device or devices configured for short-term or long-term storage of data such as, for example, memory devices and circuits, memory cards, hard disk drives, solid-state drives, or other data storage devices. For example, in some embodiments, the checkpoint cache 214 may be embodied as a flash-based memory storage device for storing persistent information. Accordingly, the checkpoint cache 214 may store application checkpoint data such as saved execution states or other, similar data. It should be appreciated that, in some embodiments, the checkpoint cache 214 may form a portion of the memory 206 or the processor 202.

Referring again to FIG. 1, the network 112 may be embodied as any type of wired or wireless communication network, including cellular networks (e.g., Global System for Mobile Communications (GSM)), digital subscriber line (DSL) networks, cable networks, telephony networks, local or wide area networks, global networks (e.g., the Internet), or any combination thereof. As described previously, the network 112 may include any number of network devices capable of facilitating wired and/or wireless network communications between the source computing device 102 and the destination computing device 114. For example, the network devices may be embodied as computers, routers, switches, network hubs, servers, storage devices, compute devices, etc.

Figure 3:
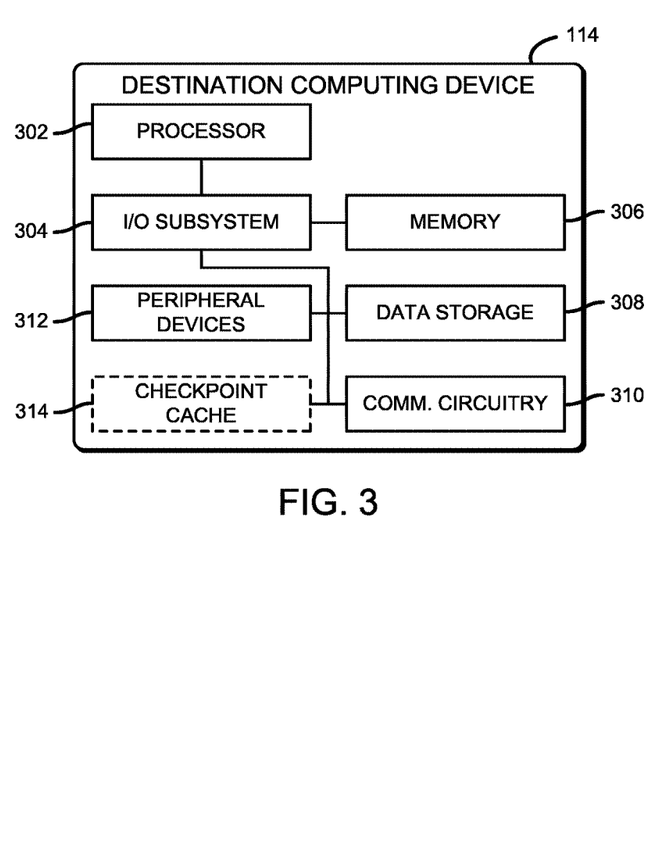
FIG. 3 is a simplified block diagram of at least one embodiment of the destination computing device of FIG. 1.

The destination computing device 114 may be embodied as any type of computation or computing device capable of performing the functions described herein, including, without limitation, a computer, a smartphone, a tablet computer, a laptop computer, a notebook computer, a desktop computer, a workstation, a mobile computing device, a wearable computing device, a multiprocessor system, a server (e.g., stand-alone, rack-mounted, blade, etc.), a network appliance (e.g., physical or virtual), a web appliance, a distributed computing system, a processor-based system, and/or a consumer electronic device. Similar to the illustrative source computing device 102 of FIG. 2, the illustrative destination computing device 114 as shown in FIG. 3, includes a processor 302, an input/output (I/O) subsystem 304, a memory 306, a data storage device 308, communication circuitry 310, peripheral devices 312, and, in some embodiments, a checkpoint cache 314. As such, further descriptions of the like components are not repeated herein for clarity of the description with the understanding that the description of the corresponding components provided above in regard to the source computing device 102 of FIG. 2 applies equally to the corresponding components of the destination computing device 114 of FIG. 3. Of course, in other embodiments, the destination computing device 114 may include other or additional or alternative components, such as those commonly found in a computing device.

Figure 4:
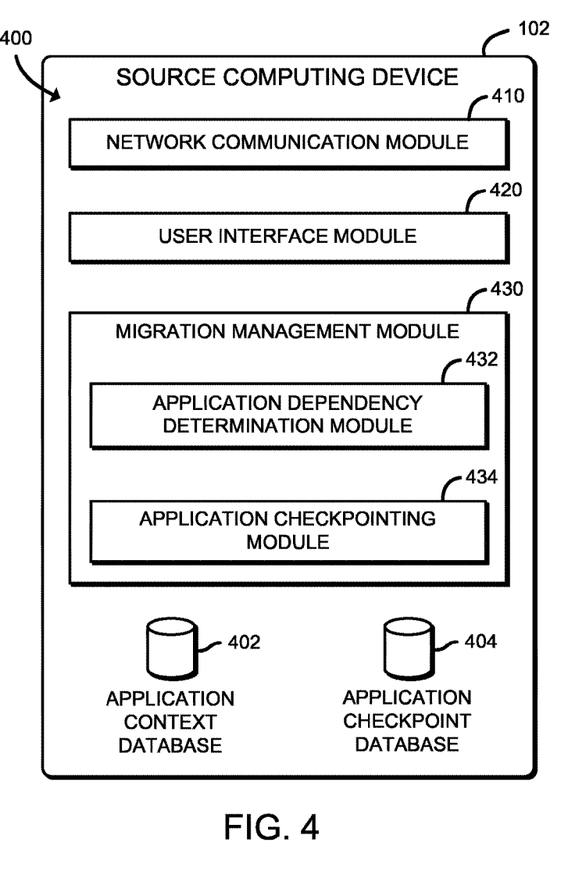
FIG. 4 is a simplified block diagram of at least one embodiment of an environment of the source computing device of FIGS. 1 and 2.

Referring now to FIG. 4, in use, the source computing device 102 establishes an environment 400 during operation. In the illustrative environment 400, the source computing device 102 includes a network communication module 410, a user interface module 420, and a migration management module 430. The various modules of the environment 400 may be embodied as hardware, firmware, software, or a combination thereof. For example, the various modules, logic, and other components of the environment 400 may form a portion of, or otherwise be established by, the processor 202 or other hardware components of the source computing device 102. As such, in some embodiments, any one or more of the modules of the environment 400 may be embodied as a circuit or collection of electrical devices (e.g., a network communication circuit, a user interface circuit, a migration management circuit, etc.). Additionally or alternatively, in some embodiments, one or more of the illustrative modules may form a portion of another module and/or one or more of the illustrative modules and/or submodules may be embodied as a standalone or independent module.

The illustrative environment 400 of the source computing device 102 additionally includes an application context database 402 and an application checkpoint database 404, each of which may be accessed by one or more of the various modules and/or sub-modules of the source computing device 102. The application context database 402 may include any data related to the environment (i.e., configuration) in which the application 104 is being executed, such as which hardware resources of the source computing device 102 and/or software resources interact with the application 104. The application checkpoint database 404 may include any data related to a state of execution of the application 104 at the time in which a checkpoint operation is requested (e.g., register values, execution pointer values, etc.), such as the application checkpoint data 108 resulting from the checkpoint operation. In some embodiments, the application checkpoint database 404 may be located in the checkpoint cache 214 or the data storage device 208 of the illustrative source computing device 102 of FIG. 2.

The network communication module 410 is configured to facilitate inbound and outbound network communications (e.g., network traffic, network packets, network flows, etc.) to and from the source computing device 102. In other words, the network communication module 410 is configured to receive and process network packets received from a computing device (e.g., the destination computing device 114) and to prepare and transmit network packets to a computing device (e.g., the destination computing device 114). Specifically, the network communication module 410 is configured to transmit application data of the application 104 to be migrated (e.g., the application checkpoint data 108 resulting from the checkpoint operation) and transmit/receive migration operation messages related to the migration of the application 104. Accordingly, in some embodiments, at least a portion of the functionality of the network communication module 410 may be performed by the communication circuitry 210.

The user interface module 420 is configured to manage an interface, such as an interface generated by one or more of the peripheral devices 212, between a user performing the migration of the application 104 and the source computing device 102. Accordingly, the user interface module 420 is configured to prompt the user for input related to the application 104 and/or the destination computing device 114 on which the application 104 is to be migrated. Further, the user interface module 420 is configured to receive the user input related to the application 104 and/or the destination computing device 114 on which the application 104 is to be migrated.

The migration management module 430 is configured to manage the migration of the application 104 from the source computing device 102 to the destination computing device 114. To do so, the migration management module 430 includes an application dependency determination module 432 and an application checkpointing module 434. The application dependency determination module 432 is configured to determine data related to any dependencies of the application 104. To do so, the application dependency determination module 432 may use any data dependency discovery and/or mapping technologies to determine the dependencies and information thereof. The application dependency information may include any data from which the application 104 depends, such as libraries, supporting infrastructure information, application configuration data (e.g., runtime information), changelogs, allocated resources, operating system, and/or any other data related to dependencies of the application 104 (e.g., file paths, version numbers, debug information, etc.).

The application checkpointing module 434 is configured to perform a checkpointing operation on a presently executing application (e.g., the application 104). For example, the application checkpointing module 434 may be configured to call one or more hardware hooks (e.g., system calls, processor instructions, etc.) to cause the source computing device 102 to save a checkpoint (i.e., the checkpoint data) for the application 104. To do so, the application checkpointing module 434 may be configured to freeze (i.e., lock) the context of the application 104 (e.g., the application context 106), such as by pausing execution of the application 104, and saving the application checkpoint data 108 (i.e., the execution state of the application 104 on which the checkpointing operation is being performed). In some embodiments, the application checkpointing module 434 may use a software tool, such as Checkpoint/Restore in Userspace (CRIU), for example, to perform the checkpointing operation. In such embodiments, the application checkpoint data 108 can be stored as a collection of files from which the application 104 may be restored at another computing device (e.g., the destination computing device 114). Further, the application checkpointing module 434 is configured to cleanup (i.e., delete) data from the application context database 402 and/or the application checkpoint database 404 associated with the application 104 upon successful restoration of the migrated application.

Figure 5:
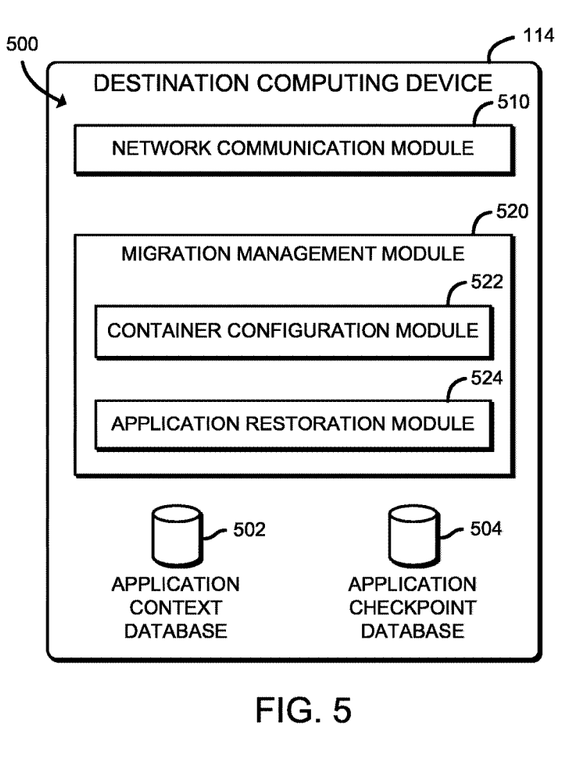
FIG. 5 is a simplified block diagram of at least one embodiment of an environment of the destination computing device of FIGS. 1 and 3.

Referring now to FIG. 5, in use, the destination computing device 114 establishes an environment 500 during operation. In the illustrative environment 500, the destination computing device 114 includes a network communication module 510 and a migration management module 520. The various modules of the environment 500 may be embodied as hardware, firmware, software, or a combination thereof. For example, the various modules, logic, and other components of the environment 300 may form a portion of, or otherwise be established by, the processor 302 or other hardware components of the destination computing device 114. As such, in some embodiments, any one or more of the modules of the environment 500 may be embodied as a circuit or collection of electrical devices (e.g., a network communication circuit, a migration management circuit, etc.). Additionally or alternatively, in some embodiments, one or more of the illustrative modules may form a portion of another module and/or one or more of the illustrative modules and/or submodules may be embodied as a standalone or independent module.

The illustrative environment 500 additionally includes an application context database 502 and an application checkpoint database 504, each of which may be accessed by one or more of the various modules and/or sub-modules of the destination computing device 114. The application context database 502, similar to the application context database 402 of the source computing device 102, may include any data related to the environment (i.e., configuration) in which the application 104 is to be restored and executed, such as which hardware resources of the source computing device 102 and/or software resources can be scheduled and/or are capable of interacting with the application 104 upon migration. The application checkpoint database 504, similar to the application checkpoint database 404 of the source computing device 102, may include any data (e.g., the application checkpoint data 108) related to a state of the application 104 that was checkpointed from which the application 104 can be restored. In some embodiments, the application checkpoint database 504 may be located in the checkpoint cache 314 or the data storage device 308 of the illustrative destination computing device 114 of FIG. 3. It should be appreciated that the application context database 502 and/or the application checkpoint database 504 may include additional and/or alternative data to the data received from the source computing device 102 and described as stored herein.

The network communication module 510 is configured to facilitate inbound and outbound network communications (e.g., network traffic, network packets, network flows, etc.) to and from the source computing device. In other words, the network communication module 510 is configured to receive and process network packets received from a computing device (e.g., the source computing device 102) and to prepare and transmit network packets to the computing device. Specifically, the network communication module 510 is configured to receive application data of the application 104 being migrated and transmit/receive migration operation messages related to the migration of the application 104. Accordingly, in some embodiments, at least a portion of the functionality of the network communication module 510 may be performed by the communication circuitry 310.

The migration management module 520 is configured to manage the migration of the application 104 to the destination computing device 114 from the source computing device 102. To do so, the migration management module 520 includes a container configuration module 522 and an application restoration module 324. The container configuration module 522 is configured to setup a software container (e.g., the container 120 of FIG. 1) on the destination computing device 114 in which the application 104 can be migrated to, restored at, and executed within. The container 120 may be embodied as any suitable operating-system-level virtualization instance in which the migrated application may be ran. To setup the container 120, in some embodiments, the container configuration module 522 may be configured to generate a script that includes various commands (i.e., instructions) and arguments for configuring the container 120 and invoke a process to execute the script (i.e., configure the container 120). The script may be generated based on the information related to any dependencies of the application 104 received from the source computing device 102. It should be appreciated that the container configuration module 522 may use an automated application deployment tool for configuring the container 120, such as Docker. In one such embodiment, the container configuration module 522 may generate a Dockerfile that includes various commands and arguments, and run the Dockerfile using a Docker daemon to configure the container 120 based on the various commands and arguments of the Dockerfile.

The application restoration module 524 is configured to restore the application 104 within the container 120 based on the application checkpoint data. That is, the application restoration module 524 is configured to run the application within the container 120 at the context point at which the application was frozen by the migration management module 430 of the source computing device 102. To restore the application 104, in some embodiments, the application restoration module 524 may use a software tool, such as Checkpoint/Restore in Userspace (CRIU), for example, to perform the restoration operation. Accordingly, in such embodiments, the restoration operation can be performed on the collection of files generated at the source computing device 102 (i.e., during the checkpoint operation). For example, the application restoration module 524 may create a script including various commands (i.e., instructions) and arguments to restore the application 104 and invoke a process that restores the application 104 based on the script. It should be appreciated that the application restoration module 524 may use an automated application deployment tool for deploying the application 104 within the container 120. In one such embodiment, wherein Docker is used, the application restoration module 524 may generate a Dockerfile that includes various commands and arguments, and build an image from which the application 104 can be restored using a Docker daemon to run the Dockerfile. Further, the application restoration module 524 is configured to cleanup (i.e., delete) data in the application checkpoint database 504 and/or the application context database 502 that is associated with the application 104, upon successful migration and restoration of the application 104.

Figure 6:
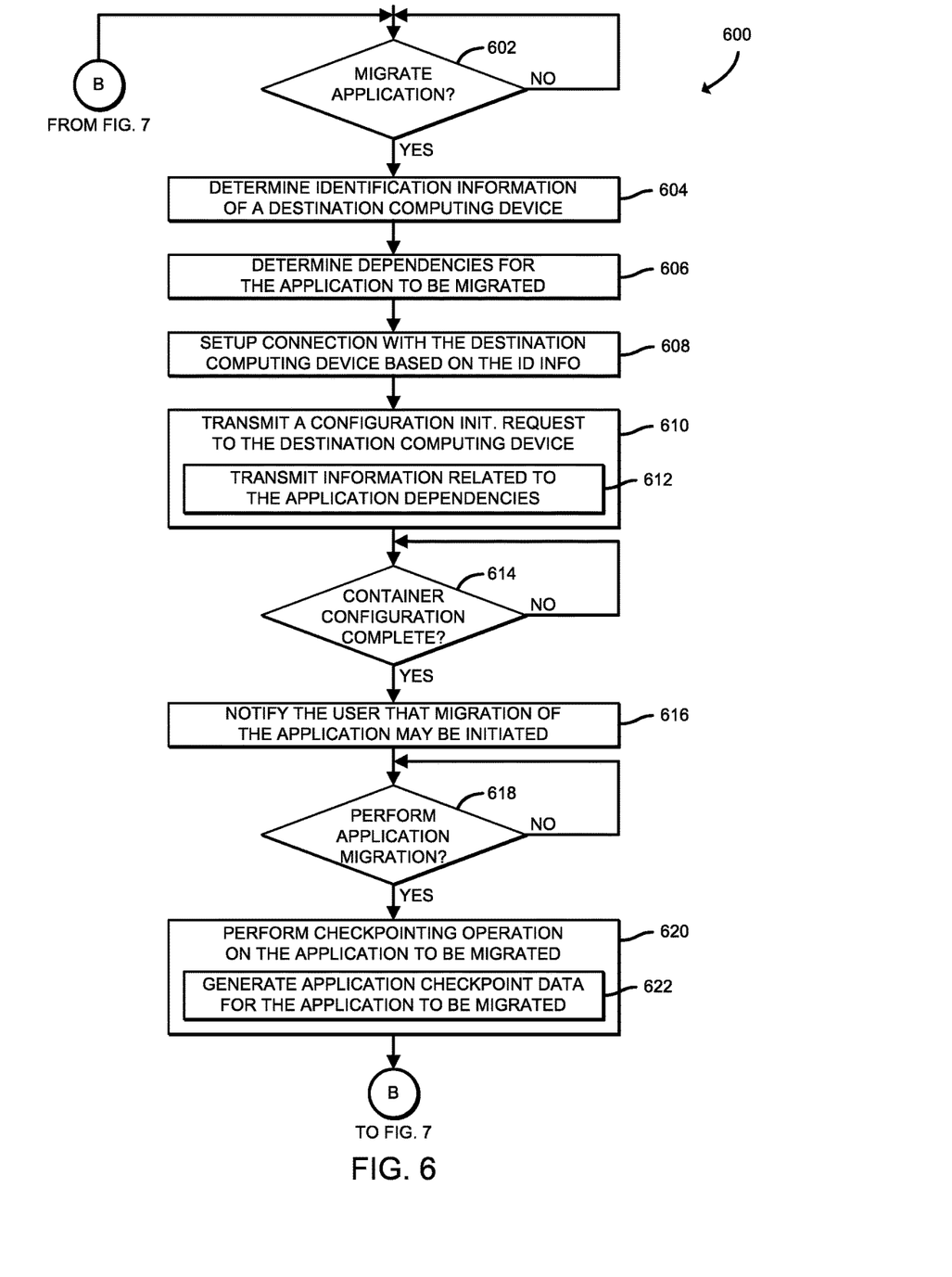
FIGS. 6 and 7 are a simplified flow diagram of at least one embodiment of a method for migrating an application to the destination computing device of FIG. 3 that may be executed by the source computing device of FIG. 2.
Figure 7:
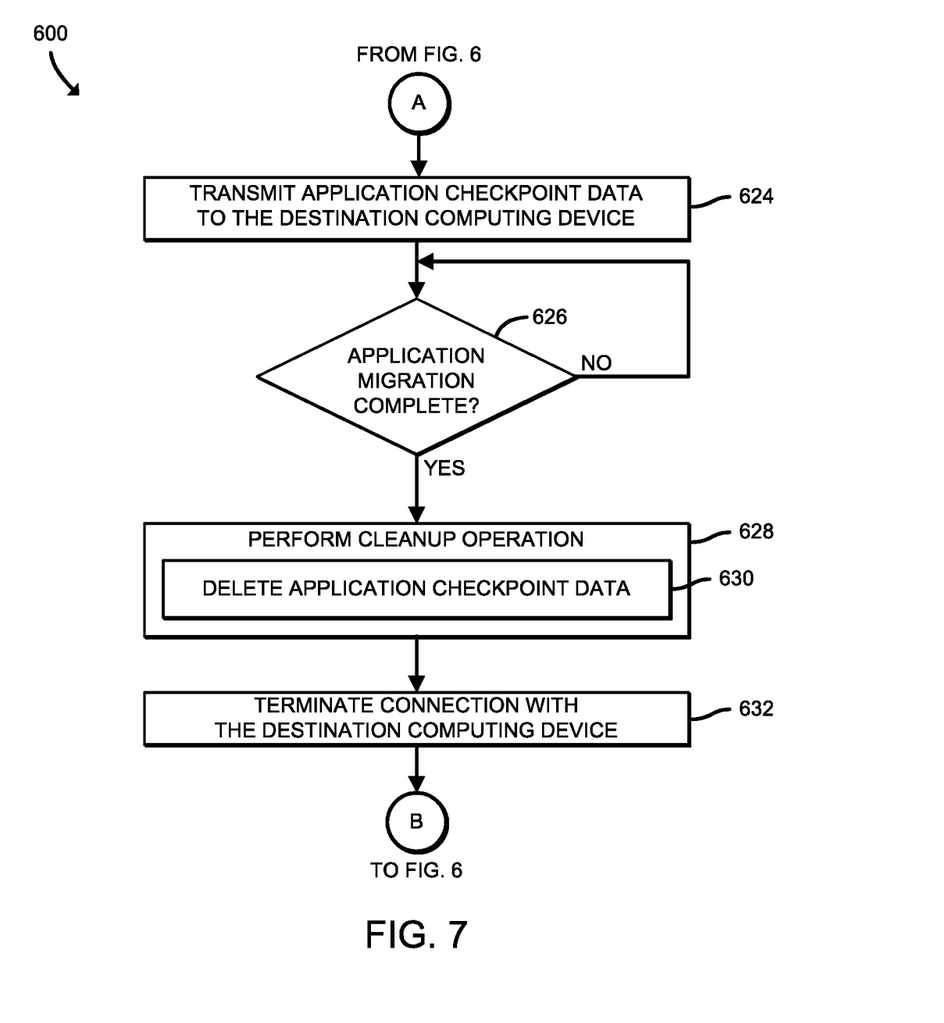

Referring now to FIGS. 6 and 7, in use, the source computing device 102 may execute a method 600 for migrating an application (e.g., the application 104) from the source computing device 102 to the destination computing device 114. The method 600 begins with block 602, in which the source computing device 102 determines whether to migrate the application 104. For example, in some embodiments, the source computing device 102 may determine whether a migration has been requested or otherwise initialized by a user of the source computing device 102 or via an automated process. In such embodiments, for example, a migration initialization signal may be generated by an input from the user that indicates the user has prompted a migration of the application 104. If the source computing device 102 determines that the application 104 is not to be migrated, the method 600 returns to block 602 to continue monitoring for a request or instruction to migrate the application 104. Otherwise, if the source computing device 102 determines that the application 104 is to be migrated, the method 600 advances to block 604.

In block 604, the source computing device 102 determines identification information of the destination computing device 114. For example, in some embodiments, the source computing device 102 may prompt the user of the source computing device 102 for identification information of the desired destination computing device 114. The identification information of the destination computing device 114 may include any type of information that the source computing device 102 (i.e., the communication circuitry 210) can use to establish a connection with the destination computing device 114. For example, the identification information may include an internet protocol (IP) address, a machine access control (MAC) address, a port number, a friendly name associated with the destination computing device 114, as well as any authentication credentials, such as a username, password, passphrase, etc.

In block 606, the source computing device 102 determines any dependencies for the application 104. To determine the dependencies, the source computing device 102 may use any data dependency discovery and/or mapping technologies. For example, the source computing device 102 may analyze the interactions of the application 104 to identify other applications and/or data accessed by or otherwise interacted with by the application 104. Of course, sophisticated dependency algorithms and procedures may be used to perform such analysis.

In block 608, the source computing device 102 sets up a connection between the source computing device 102 and the destination computing device 114 based on the identification information of the destination computing device 114 determined at block 604. In block 610, the source computing device 102 transmits a configuration initialization request to the destination computing device 114. In block 612, the source computing device 102 also transmits information related to the dependencies of the application 104 with the configuration initialization request, such as locations of installers for the dependencies on externally connected sources, version numbers of the dependencies, debug information of the dependencies, etc.

In block 614, the source computing device 102 determines whether the container 120 configuration is completed. For example, in some embodiments, the source computing device 102 may determine whether a notification was received from the destination computing device 114 that indicates the container 120 is configured. If not, the method 600 loops back to block 614 to continue to determine whether the container 120 has been configured. Otherwise, if the source computing device 102 determines that the configuration of the container 120 is complete, the method advances to block 616.

In block 616, the source computing device 102 notifies the user that the migration of the application 104 may be initiated. To do so, in some embodiments, the source computing device 102 may provide a notification to the user via one or more of the peripheral devices 212. It should be appreciated that, in some embodiments, the migration operation may be automated such that the user does not need to be prompted, in which case the method 600 may advance directly from block 610 to block 618.

In block 618, the source computing device 102 determines whether to perform a migration of the application 104. If not, the method 600 loops back to block 618 to continue to determine whether to perform the application migration. Otherwise, if the source computing device 102 determines to perform the migration of the application 104, the method 600 advances to block 620. In block 620, the source computing device 102 performs a checkpointing operation on the application 104 to be migrated. To do so, in block 622, the source computing device 102 generates application checkpoint data (e.g., the application checkpoint data 108) for the application 104 that includes state information of the application 104 at the time the migration was initiated.

In block 624 of FIG. 7, the source computing device 102 transmits the application checkpoint data to the destination computing device 114. Subsequently, in block 626, the source computing device 102 determines whether the application migration is complete. For example, in some embodiments, the destination computing device 114 may transmit an indication to the source computing device 102 that indicates the application 104 has been successfully migrated to the destination computing device 114. If the source computing device 102 determines that the migration of the application 104 was not completed, the method 600 loops back to block 626 to continue to determine whether the application migration was completed. Otherwise, if the source computing device 102 determines the migration of the application 104 was completed, the method 600 advances to block 628.

In block 628, the source computing device 102 performs a cleanup operation. To do so, in block 630, the source computing device 102 deletes the application checkpoint data generated at block 622. Additionally or alternatively, in some embodiments, the source computing device 102 may terminate the migrated application during the cleanup operation. In block 632, the source computing device 102 terminates the connection with the destination computing device 114 before returning back to block 602 to continue to determine whether to migrate the application 104.

Figure 8:
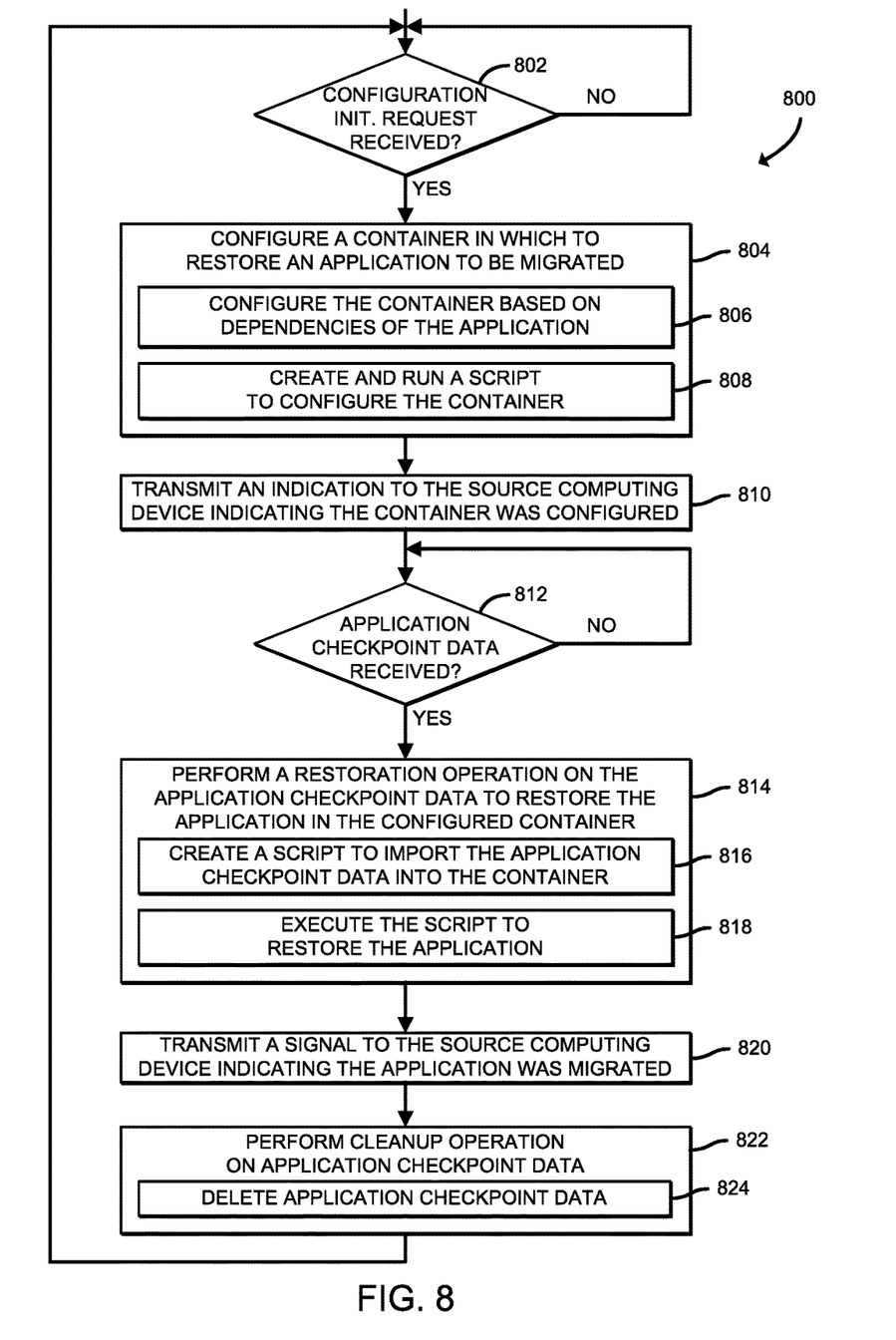
FIG. 8 is a simplified flow diagram of at least one embodiment of a method for migrating the application from the source computing device of FIG. 2 that may be executed by the destination computing device of FIG. 3.

Referring now to FIG. 8, in use, the destination computing device 114 may execute a method 800 for migrating an application (e.g., the application 104) to the destination computing device 114 from the source computing device 102. The method 800 begins with block 802, in which the destination computing device 114 determines whether a configuration initialization request to configure a container (e.g., the container 120) for the application 104 to be restored in was received. If not, the method loops back to block 802 to continue to determine whether the configuration initialization request was received. Otherwise, if the configuration initialization request was received, the method advances to block 804.

In block 804, the destination computing device 114 configures a container 120 for restoring the application 104 upon migration of context data of the application 104 to the destination computing device 114. To do so, in block 806, the destination computing device 114 configures the container 120 based on any dependencies of the application 104.

As described previously, data related to the dependencies of the application 104 may be received with the configuration initialization request. It should be appreciated that, in some embodiments, the destination computing device 114 may not have one or more of the dependencies of the application 104 stored in local memory (e.g., the data storage device 308). Accordingly, in such embodiments, the script may include instructions on how and/or where to retrieve the dependencies, or installers of the dependencies, from an external source (e.g., a remote computing device). Accordingly, whether the dependencies are retrieved from the data storage device 308 or the external source, a copy of each of the dependencies (e.g., a copy of the operating system, a copy of any packages required to run the application 104) are installed within the container 120. In other words, the container 120 acts as a sandbox to protect the environment of the destination computing device 114. In block 808, the destination computing device 114 creates a script based on the dependencies for configuring the container 120 and runs the script (e.g., via a daemon) to configure the container 120.

In block 810, the destination computing device 114 transmits an indication to the source computing device 102 indicating the container 120 has been configured. In block 812, the destination computing device 114 determines whether application checkpoint data (e.g., the application checkpoint data 108) was received from the source computing device 102. If not, the method 800 returns to block 812 to continue monitoring for the application checkpoint data 108. Otherwise, if the destination computing device 114 determines that the application checkpoint data 108 was received from the source computing device 102, the method 800 advances to block 814.

In block 814, the destination computing device 114 performs a restoration operation on the application checkpoint data 108 to restore the application 104 in the container 120 configured to support the restoration of the application 104. To do so, in block 816, the destination computing device 114 creates a script to import the application checkpoint data 108 into the container 120. As described previously, the script includes various instructions and commands for importing the application checkpoint data 108 and performing the restoration operation on the application checkpoint data 108 to restore the application 104. Additionally, in block 818, the destination computing device 114 executes the script (e.g., via a daemon) to restore the application 104 based on the instructions and commands of the script.

In block 820, the destination computing device 114 transmits a signal to the source computing device 102 that indications the application 104 was successfully migrated (e.g., the application migration complete signal). In block 822, the destination computing device 114 performs a cleanup operation on the application checkpoint data 108 received from the source computing device 102 to restore the application 104 received at block 812. To do so, in block 824, the destination computing device 114 deletes the application checkpoint data 108 before returning back to block 802 to continue to monitor whether the configuration initialization request was received.

EXAMPLES

Illustrative examples of the devices, systems, and methods disclosed herein are provided below. An embodiment of the devices, systems, and methods may include any one or more, and any combination of, the examples described below.

Example 1 includes a source computing device to migrate an application, the source computing device comprising a network communication module to (i) transmit a configuration initialization request to a destination computing device in network communication with the source computing device, wherein the configuration initialization request includes information usable by the destination computing device to create a container in which to run the application and (ii) receive, in response to the transmission of the configuration initialization request, a notification from the destination computing device that indicates the container has been created at the destination computing device; and an application checkpointing module to perform, in response to receipt of the notification from the destination computing device, a checkpointing operation on a presently running instance of the application to be migrated to generate application checkpoint data, wherein the network communication module is further to transmit the application checkpoint data to the destination computing device, wherein the application checkpoint data is usable to restore the application in the container created at the destination computing device.

Example 2 includes the subject matter of Example 1, and further including an application dependency determination module to (i) determine one or more dependencies of the application to be migrated and (ii) determine information related to the one or more dependencies of the application to be migrated, wherein to transmit the configuration initialization request further comprises to transmit the information related to the one or more dependencies of the application to be migrated.

Example 3 includes the subject matter of any of Examples 1 and 2, and further including a user interface module to notify, in response to having received the configuration initialization request, a user of the source computing device that a migration of the application to the destination computing device is ready to be initiated, and wherein to perform the checkpointing operation comprises to perform a checkpointing operation in response to a determination that the user initiated the migration of the application.

Example 4 includes the subject matter of any of Examples 1-3, and wherein the network communication module is further to receive a notification from the destination computing device that the migration of the application to be migrated is complete, and wherein the application checkpointing module is further to perform a cleanup operation on the application checkpoint data in response to having received the notification from the destination computing device that the migration of the application to be migrated is complete.

Example 5 includes the subject matter of any of Examples 1-4, and wherein to perform the checkpointing operation on the application to be migrated comprises to (i) freeze at least a portion of the application while the application is running, (ii) checkpoint the application to generate application checkpoint data that identifies a context point of the source computing device at the time at which the application was frozen, and (iii) store the application checkpoint data to a storage device of the source computing device, wherein the application checkpoint data comprises a plurality of files that are usable to restore and run the application from the context point.

Example 6 includes the subject matter of any of Examples 1-5, and wherein to perform the checkpointing operation on the application to be migrated comprises to perform the checkpointing operation using a Checkpoint/Restore in Userspace (CRIU) tool to perform the checkpointing operation.

Example 7 includes a method for migrating an application, the method comprising transmitting, by a source computing device, a configuration initialization request to a destination computing device in network communication with the source computing device, wherein the configuration initialization request includes information usable by the destination computing device to create a container in which to run the application; receiving, by the source computing device and in response to transmitting the configuration initialization request, a notification from the destination computing device that indicates the container has been created at the destination computing device; performing, by the source computing device and in response to receiving the notification from the destination computing device, a checkpointing operation on a presently running instance of the application to be migrated to generate application checkpoint data; and transmitting, by the source computing device, the application checkpoint data to the destination computing device, wherein the application checkpoint data is usable to restore the application in the container created at the destination computing device.

Example 8 includes the subject matter of Example 7, and further including determining, by the source computing device, one or more dependencies of the application to be migrated, wherein transmitting the configuration initialization request further comprises transmitting the one or more dependencies of the application to be migrated.

Example 9 includes the subject matter of any of Examples 7 and 8, and further including notifying, by the source computing device and in response to the receiving the configuration initialization request, a user of the source computing device that a migration of the application to the destination computing device is ready to be initiated, and wherein performing the checkpointing operation comprises performing a checkpointing operation in response to a determination that the user initiated the migration of the application.

Example 10 includes the subject matter of any of Examples 7-9, and further including performing, by the source computing device, a cleanup operation on the application checkpoint data in response to receiving a notification from the destination computing device that the migration of the application is complete.

Example 11 includes the subject matter of any of Examples 7-10, and wherein performing the checkpointing operation on the application to be migrated comprises (i) freezing at least a portion of the application while the application is running, (ii) checkpointing the application to generate application checkpoint data that identifies a context point of the source computing device at the time at which the application was frozen, and (iii) storing the application checkpoint data to a storage device of the source computing device, wherein the application checkpoint data comprises a plurality of files that are usable to restore and run the application from the context point.

Example 12 includes the subject matter of any of Examples 7-11, and wherein performing the checkpointing operation on the application to be migrated comprises performing the application restoration operation using a Checkpoint/Restore in Userspace (CRIU) tool to perform the checkpointing operation.

Example 13 includes a computing device comprising a processor; and a memory having stored therein a plurality of instructions that when executed by the processor cause the computing device to perform the method of any of Examples 7-12.

Example 14 includes one or more machine readable storage media comprising a plurality of instructions stored thereon that in response to being executed result in a computing device performing the method of any of Examples 7-12.

Example 15 includes a source computing device for migrating an application, the source computing device comprising means for transmitting a configuration initialization request to a destination computing device in network communication with the source computing device, wherein the configuration initialization request includes information usable by the destination computing device to create a container in which to run the application; means for receiving, in response to transmitting the configuration initialization request, a notification from the destination computing device that indicates the container has been created at the destination computing device; means for performing, in response to receiving the notification from the destination computing device, a checkpointing operation on a presently running instance of the application to be migrated to generate application checkpoint data; and means for transmitting the application checkpoint data to the destination computing device, wherein the application checkpoint data is usable to restore the application in the container created at the destination computing device.

Example 16 includes the subject matter of Example 15, and further including means for determining one or more dependencies of the application to be migrated, wherein the means for transmitting the configuration initialization request further comprises means for transmitting the one or more dependencies of the application to be migrated.

Example 17 includes the subject matter of any of Examples 15 and 16, and further including means for notifying, in response to the receiving the configuration initialization request, a user of the source computing device that a migration of the application to the destination computing device is ready to be initiated, and wherein the means for performing the checkpointing operation comprises means for performing a checkpointing operation in response to a determination that the user initiated the migration of the application.

Example 18 includes the subject matter of any of Examples 15-17, and further including means for performing a cleanup operation on the application checkpoint data in response to receiving a notification from the destination computing device that the migration of the application is complete.

Example 19 includes the subject matter of any of Examples 15-18, and wherein the means for performing the checkpointing operation on the application to be migrated comprises means for (i) freezing at least a portion of the application while the application is running, (ii) checkpointing the application to generate application checkpoint data that identifies a context point of the source computing device at the time at which the application was frozen, and (iii) storing the application checkpoint data to a storage device of the source computing device, wherein the application checkpoint data comprises a plurality of files that are usable to restore and run the application from the context point.

Example 20 includes the subject matter of any of Examples 15-19, and wherein the means for performing the checkpointing operation on the application to be migrated comprises means for performing the application restoration operation using a Checkpoint/Restore in Userspace (CRIU) tool to perform the checkpointing operation.

Example 21 includes a destination computing device to migrate an application, wherein the destination computing device comprises a network communication module to receive a configuration initialization request from a source computing device in network communication with the destination computing device; and a container configuration module to configure, in response to having received the configuration initialization request, a container in which to restore a migrated application from a context point based on the configuration initialization request; wherein the network communication module is further to (i) transmit a notification to the source computing device that indicates the container has been configured and (ii) receive, in response to the transmission of the notification, application checkpoint data associated with the application from the source computing device, wherein the application checkpoint data is usable by the destination computing device to restore the application in the container at a context point of the application at which the application checkpoint data was generated, and further comprising an application restoration module to perform an application restoration operation to restore the application in the container based on the application checkpoint data.

Example 22 includes the subject matter of Example 21, and wherein to receive the configuration initialization request includes to receive information related to one or more dependencies of the application from the source computing device, and wherein to configure the container to support running the application to be migrated comprises to configure the container based on the information related to the one or more dependences of the application received from the source computing device.

Example 23 includes the subject matter of any of Examples 21 and 22, and wherein the container configuration module is further to (i) retrieve one or more copies of the dependencies of the application to be executed within the container based on the information related to the one or more dependencies of the application from the source computing device and (ii) execute the one or more copies of the dependencies of the application within the container.

Example 24 includes the subject matter of any of Examples 21-23, and wherein to retrieve the one or more copies of the dependencies of the application to be executed within the container comprises to retrieve the one or more copies of the dependencies of the application from at least one of a local storage device of the destination computing device and a remote computing device in network connection with the destination computing device.

Example 25 includes the subject matter of any of Examples 21-24, and wherein to configure the container to support running the application to be migrated comprises to (i) create a script to implement the one or more dependences of the application and (ii) execute the script to generate the container.

Example 26 includes the subject matter of any of Examples 21-25, and wherein to import the application checkpoint data into the container comprises to (i) create a script to import the application checkpoint data into the container and (ii) execute the script via a daemon to restore the application based on the application checkpoint data.

Example 27 includes the subject matter of any of Examples 21-26, and wherein to create the script to import the application checkpoint data into the container comprises to create a Docker script to import the application checkpoint data into the container, wherein the container is a Docker container, and wherein to execute the script to restore the application based on the application checkpoint data comprises to run a Docker daemon to execute the script to restore the application.

Example 28 includes the subject matter of any of Examples 21-27, and wherein performing the application restoration operation on the application to be migrated comprises performing the application restoration operation using a Checkpoint/Restore in Userspace (CRIU) tool to perform the application restoration operation.

Example 29 includes a method for migrating an application, wherein the method comprises receiving, by a destination computing device, a configuration initialization request from a source computing device in network communication with the destination computing device; configuring, by the destination computing device and in response to receiving the configuration initialization request, a container in which to restore a migrated application from a context point based on the configuration initialization request; transmitting, by the destination computing device, a notification to the source computing device that indicates the container has been configured; receiving, by the destination computing device and in response to transmitting the notification to the source computing device, application checkpoint data associated with the application from the source computing device in response to the notification, wherein the application checkpoint data is usable by the destination computing device to restore the application in the container at a context point of the application at which the application checkpoint data was generated; and performing, by the destination computing device, an application restoration operation to restore the application in the container based on the application checkpoint data.

Example 30 includes the subject matter of Example 29, and wherein receiving the configuration initialization request includes receiving one or more dependencies of the application from the source computing device, and wherein configuring the container to support running the application to be migrated comprises configuring the container based on the one or more dependences of the application received from the source computing device.

Example 31 includes the subject matter of any of Examples 29 and 30, and further including retrieving, by the destination computing device, one or more copies of the dependencies of the application to be executed within the container; and executing, by the destination computing device, the one or more copies of the dependencies of the application within the container.

Example 32 includes the subject matter of any of Examples 29-31, and wherein retrieving the one or more copies of the dependencies of the application to be executed within the container comprises retrieving the one or more copies of the dependencies of the application from at least one of a local storage device of the destination computing device and a remote computing device in network connection with the destination computing device.

Example 33 includes the subject matter of any of Examples 29-32, and wherein configuring the container to support running the application to be migrated comprises (i) creating a script to implement the one or more dependences of the application and (ii) executing the script to generate the container.

Example 34 includes the subject matter of any of Examples 29-33, and wherein importing the application checkpoint data into the container comprises (i) creating a script to import the application checkpoint data into the container and (ii) executing the script via a daemon to restore the application based on the application checkpoint data.

Example 35 includes the subject matter of any of Examples 29-34, and wherein creating the script to import the application checkpoint data into the container comprises creating a Docker script to import the application checkpoint data into the container, wherein the container is a Docker container, and wherein executing the script to restore the application based on the application checkpoint data comprises running a Docker daemon to execute the script to restore the application.

Example 36 includes the subject matter of any of Examples 29-35, and wherein performing the application restoration operation on the application to be migrated comprises performing the application restoration operation using a Checkpoint/Restore in Userspace (CRIU) tool to perform the application restoration operation.

Example 37 includes a computing device comprising a processor; and a memory having stored therein a plurality of instructions that when executed by the processor cause the computing device to perform the method of any of Examples 29-36.

Example 38 includes one or more machine readable storage media comprising a plurality of instructions stored thereon that in response to being executed result in a computing device performing the method of any of Examples 29-36.

Example 39 includes a destination computing device for migrating an application, wherein the destination computing device comprises means for receiving a configuration initialization request from a source computing device in network communication with the destination computing device; means for configuring, in response to receiving the configuration initialization request, a container in which to restore a migrated application from a context point based on the configuration initialization request; means for transmitting a notification to the source computing device that indicates the container has been configured; means for receiving, in response to transmitting the notification to the source computing device, application checkpoint data associated with the application from the source computing device in response to the notification, wherein the application checkpoint data is usable by the destination computing device to restore the application in the container at a context point of the application at which the application checkpoint data was generated; and means for performing an application restoration operation to restore the application in the container based on the application checkpoint data.

Example 40 includes the subject matter of Example 39, and wherein the means for receiving the configuration initialization request includes means for receiving one or more dependencies of the application from the source computing device, and wherein the means for configuring the container to support running the application to be migrated comprises means for configuring the container based on the one or more dependences of the application received from the source computing device.

Example 41 includes the subject matter of any of Examples 39 and 40, and further including means for retrieving one or more copies of the dependencies of the application to be executed within the container; and means for executing the one or more copies of the dependencies of the application within the container.

Example 42 includes the subject matter of any of Examples 39-41, and wherein the means for retrieving the one or more copies of the dependencies of the application to be executed within the container comprises means for retrieving the one or more copies of the dependencies of the application from at least one of a local storage device of the destination computing device and a remote computing device in network connection with the destination computing device.

Example 43 includes the subject matter of any of Examples 39-42, and wherein the means for configuring the container to support running the application to be migrated comprises means for (i) creating a script to implement the one or more dependences of the application and (ii) executing the script to generate the container.

Example 44 includes the subject matter of any of Examples 39-43, and wherein the means for importing the application checkpoint data into the container comprises means for (i) creating a script to import the application checkpoint data into the container and (ii) executing the script via a daemon to restore the application based on the application checkpoint data.

Example 45 includes the subject matter of any of Examples 39-44, and wherein the means for creating the script to import the application checkpoint data into the container comprises means for creating a Docker script to import the application checkpoint data into the container, wherein the container is a Docker container, and wherein the means for executing the script to restore the application based on the application checkpoint data comprises means for running a Docker daemon to execute the script to restore the application.

Example 46 includes the subject matter of any of Examples 39-45, and wherein the means for performing the application restoration operation on the application to be migrated comprises means for performing the application restoration operation using a Checkpoint/Restore in Userspace (CRIU) tool to perform the application restoration operation.

The invention claimed is:
1. A source computing device to migrate an application, the source computing device comprising:
  a processor; and
  a memory that comprises instructions stored thereon, which when executed by the source computing device, causes the source computing device to:
    receive a user input related to an application that is to be migrated and identification information of a destination computing device;
    determine one or more dependencies of the application and information related to the one or more dependencies of the application;
    transmit a configuration initialization request to the destination computing device in network communication with the source computing device, wherein the configuration initialization request includes information usable by the destination computing device to create a container in which to run the application, and wherein the information usable to create a container includes the information related to the one or more dependencies of the application to be migrated;
    receive, in response to the transmission of the configuration initialization request, a notification from the destination computing device that indicates the container has been created at the destination computing device;
    perform, in response to a receipt of the notification from the destination computing device, a check- pointing operation on a presently running instance of the application to be migrated to generate application checkpoint data; and transmit the application checkpoint data to the destination computing device, wherein the application checkpoint data is usable to restore the application in the container created at the destination computing device.

2. The source computing device of claim 1, wherein the memory further comprises instructions stored thereon, which when executed by the source computing device, causes the source computing device to notify, in response to having received the notification from the destination computing device, a user of the source computing device that a migration of the application to the destination computing device is ready to be initiated, and wherein to perform the checkpointing operation comprises to perform a checkpointing operation in response to a determination that the user initiated the migration of the application.

3. The source computing device of claim 1, wherein the memory further comprises instructions stored thereon, which when executed by the source computing device, causes the source computing device to:
receive a notification from the destination computing device that the migration of the application to be migrated is complete, and
perform a cleanup operation on the application checkpoint data in response to having received the notification from the destination computing device that the migration of the application to be migrated is complete.

4. The source computing device of claim 1, wherein to perform the checkpointing operation on the application to be migrated comprises to (i) freeze at least a portion of the application while the application is running, (ii) checkpoint the application to generate application checkpoint data that identifies a context point of the source computing device at the time at which the application was frozen, and (iii) store the application checkpoint data to a storage device of the source computing device, wherein the application checkpoint data comprises a plurality of files that are usable to restore and run the application from the context point.

5. One or more non-transitory, computer-readable storage media comprising a plurality of instructions stored thereon that in response to being executed cause a source computing device to:
receive a user input related to an application that is to be migrated and identification information of a destination computing device;
determine one or more dependencies of the application to be migrated and determine information related to the one or more dependencies of the application to be migrated;
transmit a configuration initialization request to the destination computing device in network communication with the source computing device, wherein the configuration initialization request includes information usable by the destination computing device to create a container in which to run the application, and wherein the information usable to create a container includes the information related to the one or more dependencies of the application to be migrated;
receive, in response to having transmitted the configuration initialization request, a notification from the destination computing device that indicates the container has been created at the destination computing device;
perform, in response to having received the notification from the destination computing device, a checkpointing operation on a presently running instance of the application to be migrated to generate application checkpoint data; and
transmit the application checkpoint data to the destination computing device, wherein the application checkpoint data is usable to restore the application in the container created at the destination computing device.

6. The one or more non-transitory, computer-readable storage media of claim 5, further comprising a plurality of instructions that in response to being executed cause the source computing device to notify, in response to having received the notification from the destination computing device, a user of the source computing device that a migration of the application to the destination computing device is ready to be initiated, and wherein to perform the checkpointing operation comprises to perform a checkpointing operation in response to a determination that the user initiated the migration of the application.

7. The one or more non-transitory, computer-readable storage media of claim 5, further comprising a plurality of instructions that in response to being executed cause the source computing device to perform a cleanup operation on the application checkpoint data in response to having received a notification from the destination computing device that the migration of the application is complete.

8. The one or more non-transitory, computer-readable storage media of claim 5, wherein to perform the checkpointing operation on the application to be migrated comprises to (i) freeze at least a portion of the application while the application is running, (ii) checkpointing the application to generate application checkpoint data that identifies a context point of the source computing device at the time at which the application was frozen, and (iii) store the application checkpoint data to a storage device of the source computing device, wherein the application checkpoint data comprises a plurality of files that are usable to restore and run the application from the context point.

9. A destination computing device to migrate an application, wherein the destination computing device comprises:
a processor; and
a memory that comprises instructions stored thereon, which when executed by the source computing device, causes the destination computing device to:
receive a configuration initialization request from a source computing device in network communication with the destination computing device, wherein the configuration initialization request includes information related to one or more dependencies of the application from the source computing device;
configure, in response to having received the configuration initialization request, a container in which to restore a migrated application from a context point based at least on one or more dependencies of the application to be migrated;
transmit a notification to the source computing device that indicates the container has been configured;
receive, in response to the transmission of the notification, application checkpoint data associated with the application from the source computing device, wherein the application checkpoint data is usable by the destination computing device to restore the application in the container at a context point of the application at which the application checkpoint data was generated, and
perform an application restoration operation to restore the application in the container based on the application checkpoint data.

10. The destination computing device of claim 9, wherein to receive the configuration initialization request includes to receive information related to one or more dependencies of the application from the source computing device, and wherein to configure the container to support running the application to be migrated comprises to configure the container based on the information related to the one or more dependences of the application received from the source computing device.

11. The destination computing device of claim 10, wherein the memory further comprises instructions stored thereon, which when executed by the source computing device, causes the destination computing device to (i) retrieve one or more copies of the dependencies of the application to be executed within the container based on the information related to the one or more dependencies of the application from the source computing device and (ii) execute the one or more copies of the dependencies of the application within the container.

12. The destination computing device of claim 11, wherein to retrieve the one or more copies of the dependencies of the application to be executed within the container comprises to retrieve the one or more copies of the dependencies of the application from at least one of a local storage device of the destination computing device and a remote computing device in network connection with the destination computing device.

13. The destination computing device of claim 10, wherein to configure the container to support running the application to be migrated comprises to (i) create a script to implement the one or more dependences of the application and (ii) execute the script to generate the container.

14. The destination computing device of claim 9, wherein to import the application checkpoint data into the container comprises to (i) create a script to import the application checkpoint data into the container and (ii) execute the script via a daemon to restore the application based on the application checkpoint data.

15. One or more non-transitory, computer-readable storage media comprising a plurality of instructions stored thereon that in response to being executed cause a destination computing device to:
receive a configuration initialization request from a source computing device in network communication with the destination computing device, wherein the configuration initialization request includes information related to one or more dependencies of the application from the source computing device;
configure, in response to having received the configuration initialization request, a container in which to restore a migrated application from a context point based at least on one or more dependencies of the application to be migrated;
transmit a notification to the source computing device that indicates the container has been configured;
receive, in response to having transmitted the notification to the source computing device, application checkpoint data associated with the application from the source computing device in response to the notification, wherein the application checkpoint data is usable by the destination computing device to restore the application in the container at a context point of the application at which the application checkpoint data was generated; and
perform an application restoration operation to restore the application in the container based on the application checkpoint data.

16. The one or more non-transitory, computer-readable storage media of claim 15, wherein to receive the configuration initialization request includes to receive one or more dependencies of the application from the source computing device, and wherein to configure the container to support running the application to be migrated comprises to configure the container based on the one or more dependences of the application received from the source computing device.

17. The one or more non-transitory, computer-readable storage media of claim 16, further comprising a plurality of instructions that in response to being executed cause the destination computing device to:
retrieve one or more copies of the dependencies of the application to be executed within the container; and
execute the one or more copies of the dependencies of the application within the container.

18. The one or more non-transitory, computer-readable storage media of claim 17, wherein to retrieve the one or more copies of the dependencies of the application to be executed within the container comprises to retrieve the one or more copies of the dependencies of the application from at least one of a local storage device of the destination computing device and a remote computing device in network connection with the destination computing device.

19. The one or more non-transitory, computer-readable storage media of claim 16, wherein to configure the container to support running the application to be migrated comprises to (i) create a script to implement the one or more dependences of the application and (ii) execute the script to generate the container.

20. The one or more non-transitory, computer-readable storage media of claim 15, wherein to import the application checkpoint data into the container comprises to (i) create a script to import the application checkpoint data into the container and (ii) execute the script via a daemon to restore the application based on the application checkpoint data.

* * * * *